Patented Jan. 2, 1951

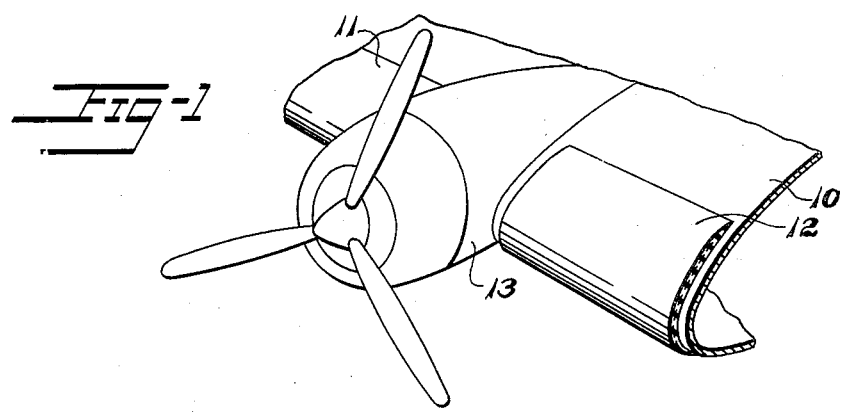
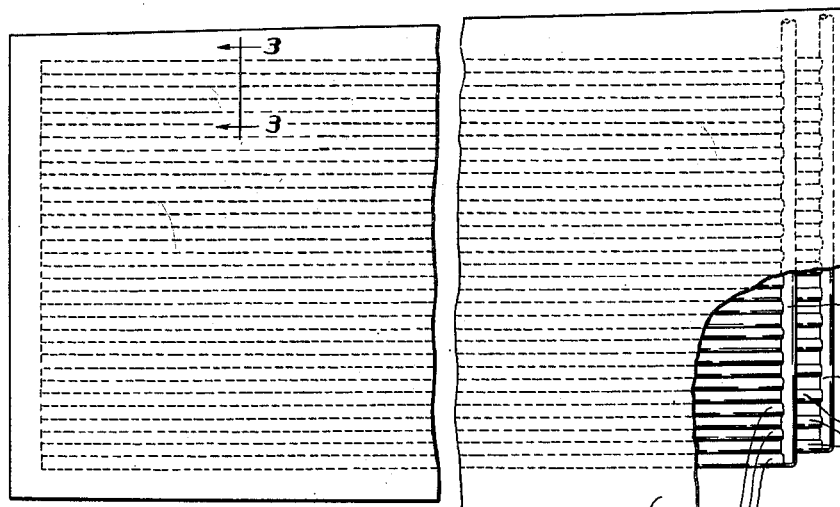
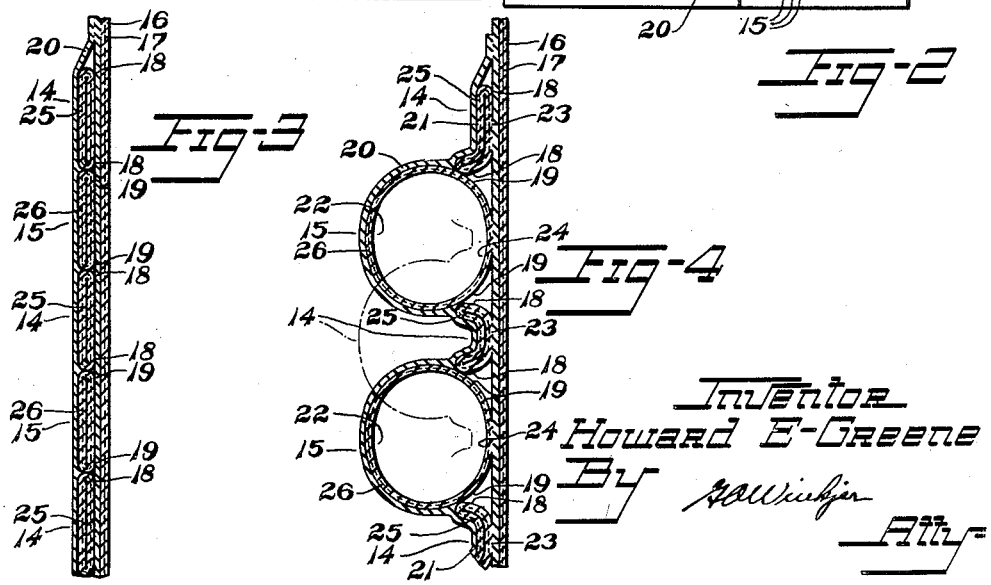

2,536,739

UNITED STATES PATENT OFFICE 2,536,739

APPARATUS FOR PREVENTING THE ACCUMULATION OF ICE UPON SURFACES

Howard E. Greene, Shaker Heights, Ohio, assignor to The B. F. Goodrich Company, New York, N. Y., a corporation of New York Application December 18, 1947, Serial No. 792,528

11 Claims. (Cl. 244—134)

The invention relates to apparatus for preventing the accumulation of ice upon surfaces such, for example, as airfoils of aircraft exposed to ice-forming conditions, and especially to inflatable coverings for the leading edges of airfoils.

In prior coverings having inflatable tubes in side-by-side relation, the inflation of each tube has been ordinarily accompanied by a distension of the overlying surface that is a maximum at the central portion of the tube as viewed in section, and is less toward the marginal portions of the tube which are anchored and therefore less free for distension. At the junctures of the tubes, the distension may in some cases be insufficient to rupture completely the ice or very small parts thereof.

It is desirable to provide a construction in which a large degree of effective stretchability is provided entirely across the surface overlying the tubes including the zones at the junctures of the tubes as well as intermediate portions thereof, and it is an object of the invention to provide a construction capable of accomplishing this result.

Other objects of the invention are to provide for inflating side-by-side portions of distensible coverings in an overlapping manner; to provide for inflating a marginal portion of the wall of an inflatable passage laterally of the passage in overlapping relation to the position of an uninflated adjacent passage; to provide for yielding of such marginal portion so that it may lift or swing away from the underlying material of the covering; to provide for extensive stretchability throughout at least a large part of the circumference of the walls of the passages; and to provide for simplicity of construction, convenience of manufacture and attachment, and for effectiveness of operation.

These and other objects and advantages of the invention will be apparent from the following description.

In the accompanying drawings which form a part of this specification, and in which like numerals are employed to designate like parts throughout the same:

Fig. 1 is a perspective view from above of inflatable apparatus or protective coverings on the leading edge of an aircraft wing and constructed in accordance with and embodying the invention, parts being broken away and in section, Fig. 2 is a plan view from above of an inflatable covering before attachment to the wing, parts being broken away, Fig. 3 is a sectional view taken along line 3—3 of Fig. 2, parts being broken away, and Fig. 4 is a view like Fig. 3 but showing alternate tubes in the inflated condition, broken lines illustrating the position of the uninflated adjacent tubes when same are inflated subsequently.

The protective covering construction shown in the drawings is adapted to be mounted on the leading edge of an aircraft wing 10 or other airfoil or surface exposed to ice-forming conditions and at the desired locations, such, for example, as indicated at 11 and 12 of Fig. 1 at the outboard and inboard sides of an engine nacelle 13. The covering may be secured to the wing in a suitable manner and is desirably attached thereto by utilizing a rubber cement of the air-curing type for facilitating securely adhering the covering throughout the full extent thereof to the wing.

The illustrated embodiment of the invention provides a plurality of inflatable passages or tubes 14, 14 and 15, 15 disposed in side-by-side relation upon a flexible inner wall or sheet backing 16 of resilient rubber or other rubber-like material having, desirably, a reinforcement 17 therein of substantially non-stretchable woven fabric of textile or other suitable filamentary material.

The tubes in the uninflated condition shown especially in Fig. 3, are positioned in the covering with their marginal portions 18, 18 and 19, 19 secured together and disposed directly alongside one another, that is in contact or approximately in contact along a median line at the adjacent marginal portions of adjacent tubes 14, 15. The wall of each tube 14, 15 comprises an outer circumferential portion 21, 22 fully attached across the width of the tube to a relatively thin outer wall 20 of suitable resilient rubber-like material, and an inner circumferential portion 23, 24 attached to the backing 16 intermediate the spaced-apart marginal portions of the tube so that these marginal portions are yieldable to lift away from the backing 16 relative to such attached intermediate portion of the tube. The wall of each tube which is extensively stretchable throughout at least the major part of the circumference of the tube, is made of suitable resilient rubber-like material having desirably a stretchable, annular reinforcement 25, 26 for resisting blowout failure of the tube under inflation and for transmitting stretching substantially uniformly along the major part of the circumferential extent of the wall and providing lateral stretchability of the marginal portions of the tube. The reinforcement 25, 26 may be stockinette or other elastic knitted or other suitable stretchable material. Good results have been obtained with a reinforcement of knitted nylon fabric having high stretchability.

The inner circumferential portions 23, 24 of the tubes being attached to the sheet backing 16 over only part of their widths, as shown especially in Fig. 4, makes possible under alternate inflation of the tubes, a lifting or swinging movement of the adjacent margins 18, 19 away from the backing relative to the attached intermediate portions of the tubes for promoting lateral distension and inflation of the tubes in overlapping relation to the position of the margins of the uninflated adjacent tubes.

Advantages of the construction described hereinabove may be availed of in a spanwise disposition of the inflatable tubes 14, 15 as shown in the drawings, or in a chordwise or other disposition, and with tubes of large diameters as well as tubes of small diameters. The plurality of tubes 14, 14 constitute one series simultaneously inflatable by virtue of their communication with an inflating manifold 28 extending across the tubes at one end at 27 of the covering. The plurality of tubes 15, 15 constitute a second series similarly inflatable and connected to a second inflating manifold 29 at the end at 27 of the covering. The manifolds 28, 29 are connected to suitable valve control means and source of air under pressure (not shown) suitably located in the aircraft structure such, for example, as the engine nacelle 13, whereby the first series of tubes 14, 14 are inflated in alternation with the second series of tubes 15, 15. The fabric and rubber parts of the covering are desirably united integrally, except as hereinabove described, as by vulcanization under heat and pressure.

Under alternate inflation, as shown especially in Fig. 4, each tube 15 distends from its uninflated relatively flat condition to a generally circular or oval shape of relatively greater width than that of the tube in the uninflated condition. In this distension of the tube, the margins 19, 19 thereof lift away from the backing relative to the tube portion intermediate such margins and stretch to overlie the margins 18, 18 of the adjacent tubes 14, 14. Such distension effects extensive stretching of the overlying surface at both the central portion and the respective marginal portions of the distended tube 15, as viewed in section, and also effects stretching and working of the surface laterally beyond the marginal portions of the tube substantially into the areas occupied by the uninflated adjacent tubes.

The adjacent margins 18, 18 of the uninflated tubes 14, 14 next to the tube 15 being in separated and yieldable relation to the backing and secured to the margins 19, 19 of the tube 15, move with the latter margins and are flexed outwardly away from the backing under the inflation of the tube 15 so as not to hamper objectionably the distension of the outer wall. The inflation of the tube 15 together with the lifting of the margin 18 of the tube 14 compresses the outer circumferential portion 21 of and the outer wall 20 at the tube 14, which compression tends to buckle such portion and outer wall. The buckling of the outer wall at the tube 14 assists the ice-removing action between the spaced-apart tubes 15, 15 by additional working of the surface. If this buckling is not desired, it may be avoided at least in part by maintaining the tube 14 under suction while in the uninflated condition.

The bulging and lateral distending actions of each tube 14, are, as shown by broken lines in Fig. 4, similar to those described hereinabove with regard to each tube 15, and include lifting and stretching of the margins 18, 18 in overlapping relation to the position of the uninflated adjacent tubes 15, 15 at the junctures between the tubes 14, 15.

The tubes 14, 14 and 15, 15 under alternate inflation thus each inflate to a distended generally oval form of greater width than the uninflated width thereof, thereby providing a large degree of effective distension and stretching across the rubber surface overlying the tubes including the zones at the junctures of the tubes as well as the portions thereof between the zones.

Variations may be made without departing from the scope of the invention as it is defined in the following claims.

I claim:

1. Apparatus for preventing the accumulation of ice upon a surface exposed to ice-forming conditions, said apparatus comprising a covering of resilient rubber-like material having walls therein defining a plurality of inflatable passages overlying a sheet backing, said passages being disposed in side-by-side relation with the adjacent marginal wall portions of adjacent passages directly alongside one another, the walls of said passages being distensible for inflation of adjacent passages in alternation to an inflated width greater than the uninflated width thereof to work the outer surface of the covering overlying the uninflated adjacent passage, said walls of said passages intermediate their marginal portions being secured to said backing and said marginal wall portions being yieldable to lift away from said backing relative to the intermediate wall portions of said passages for inflation of each passage in overlapping relation to the position of the marginal wall portion of the uninflated adjacent passage upon inflation of adjacent passages in alternation.

2. Apparatus for preventing the accumulation of ice upon a surface exposed to ice-forming conditions, said apparatus comprising a covering of resilient rubber-like material having walls therein defining a plurality of inflatable passages overlying a sheet backing, said passages being disposed in side-by-side relation with the adjacent marginal wall portions of adjacent passages directly alongside one another, the walls of said passages being distensible for alternate inflation of adjacent passages to an inflated width greater than the uninflated width thereof to work the outer surface of the covering overlying the uninflated adjacent passage, said walls of said passages intermediate their marginal wall portions being secured to said backing and said adjacent marginal wall portions being attached to one another for movement together and being yieldable to lift away from said backing relative to the intermediate wall portions of said passages for inflation of each passage in overlapping relation to the position of the marginal wall portion of the uninflated adjacent passage upon inflation of adjacent passages in alternation.

3. Apparatus for preventing the accumulation of ice upon a surface exposed to ice-forming conditions, said apparatus comprising a sheet backing for mounting upon said surface, an outer wall of distensible material, a plurality of flattened inflatable tubes disposed in side-by-side relation upon said backing and beneath the distensible outer wall in united relation to said wall and disposed with the respective margins of adjacent tubes directly alongside one another, each said tube being distensible for inflation thereof to an inflated width greater than the uninflated width thereof, said tubes intermediate their marginal portions being secured to said backing and said marginal portions being yieldable to lift away from said backing relative to the intermediate portions of the tubes for inflation of each tube in overlapping relation to the position of the marginal portion of the uninflated adjacent tube so as to work the surface of said outer wall overlying said adjacent tube upon inflation of adjacent tubes in alternation.

4. Apparatus for preventing the accumulation of ice upon a surface exposed to ice-forming conditions, said apparatus comprising a sheet backing for mounting upon said surface, an outer wall of distensible material, a plurality of flattened inflatable tubes disposed in side-by-side relation upon said backing and beneath the distensible outer wall in united relation to said wall and deposed with the adjacent marginal portions of adjacent tubes directly alongside one another, each said tube being distensible for inflation thereof to an inflated width greater than the uninflated width thereof, said tubes intermediate their marginal portions being secured to said backing and said adjacent marginal portions being secured for movement together and being yieldable to lift away from said backing relative to the intermediate portions of the tubes for inflation of each tube in overlapping relation to the position of the marginal portion of the uninflated adjacent tube so as to work the surface of said outer wall overlying said adjacent tube upon inflation of adjacent tubes in alternation.

5. Apparatus for preventing the accumulation of ice upon a surface exposed to ice-forming conditions, said apparatus comprising a sheet backing for mounting upon said surface, a pair of flattened inflatable tubes disposed in side-by-side relation upon said backing with the adjacent margins of adjacent tubes approximately in contact with one another and secured for movement together, each tube comprising a wall of resilient rubber-like material extensively stretchable circumferentially thereof for facilitating inflation of the tube to an inflated width greater than the uninflated width thereof, said tubes intermediate their marginal portions being secured to said backing over a portion of each tube less than the width of the uninflated tube to provide spaced-apart attached portions of the respective tubes, and the adjacent marginal portions between said attached portions being yieldable to lift away from said backing relative to the intermediate portions of the tubes for inflation of each tube in overlapping relation to the position of the marginal portion of the uninflated adjacent tube upon inflation of adjacent tubes in alternation, and means for inflating adjacent tubes in alternation.

6. Apparatus for preventing the accumulation of ice upon a surface exposed to ice-forming conditions, said apparatus comprising a sheet backing for mounting upon said surface, a plurality of flattened inflatable tubes disposed in side-by-side relation upon said backing with the adjacent margins of adjacent tubes in contact with one another and secured for movement together, each said tube comprising resilient rubber-like material and being stretchable throughout a major part of the circumferential extent of the tube to permit inflation of the latter to an inflated width greater than the uninflated width thereof, said tubes intermediate their marginal portions being attached to said backing over a portion of each tube less than the width of the uninflated tube to provide spaced-apart attached portions of the respective tubes, and said marginal portions between said attached portions being in unattached relation to said backing to permit lifting of said marginal portions away from said backing relative to the attached intermediate portions of the tubes for inflation of each tube in overlapping relation to the position of the marginal portion of the uninflated adjacent tube upon inflation of adjacent tubes in alternation, and means for inflating adjacent tubes in alternation.

7. Apparatus for preventing the accumulation of ice upon the leading edge of an airfoil, said apparatus comprising a sheet backing for mounting upon said leading edge, an outer wall of resilient rubber-like material, a plurality of flattened inflatable tubes disposed in side-by-side relation upon said backing and beneath the outer wall in united relation to said wall and disposed with the adjacent margins of adjacent tubes directly alongside one another, the wall of each tube comprising resilient rubber-like material having a continuous annular reinforcement of elastic fabric therein for inflation of the tube to an inflated width greater than the uninflated width thereof, said tubes intermediate their marginal portions being attached to said backing over only part of their uninflated width and the adjacent marginal portions being secured for movement together and being in unattached relation to said backing to permit lifting of said marginal portions away from said backing relative to the attached intermediate portions of the respective tubes for inflation of each tube in overlapping relation to the position of said marginal portion of the uninflated adjacent tube to work the surface of said outer wall overlying said adjacent tube upon inflation of adjacent tubes in alternation, and means for inflating adjacent tubes in alternation.

8. Apparatus for preventing the accumulation of ice upon the leading edge of an airfoil, said apparatus comprising a sheet backing for mounting upon said leading edge, an outer wall of distensible material, a pair of inflatable tubes disposed in side-by-side relation upon said backing and beneath the distensible outer wall of the covering in united relation to said wall and disposed with the adjacent marginal portions of said tubes directly alongside one another, said tubes comprising resilient rubber-like material and being distensible for alternate inflation thereof to an inflated width greater than the uninflated width thereof for working the surface of said outer wall overlying the adjacent tube and said tubes being secured to said backing intermediate their margins, said marginal portions being secured to said outer wall for movement therewith under said alternate inflation of the tubes and being yieldable to lift away from said backing relative to the intermediate portions of the tubes for inflation of each tube in overlapping relation to the position of said marginal portion of the uninflated adjacent tube upon said alternate inflation of said tubes.

9. Apparatus for preventing the accumulation of ice upon the leading edge of an airfoil, said apparatus comprising a sheet backing for mounting upon said leading edge, an outer wall of resilient rubber-like material, a pair of flattened inflatable tubes disposed in side-by-side relation upon said backing and beneath the outer wall in united relation to said wall and disposed with the adjacent marginal portions of said tubes approximately in contact with one another, the wall of one of said tubes comprising resilient rubber-like material and being distensible for inflation of the tube to an inflated width greater than the uninflated width thereof, the wall of the other tube being of distensible material including a reinforcement of elastic fabric at said marginal portion thereof for inflation of said other tube to a generally rounded shape, said tubes intermediate their margins being secured to said backing, and said marginal portion of the first said tube being of said rubber-like material and yieldable to stretch laterally of such tube and away from said backing relative to the intermediate portion of such tube for inflation thereof in overlapping relation to the position of said marginal portion of the uninflated said other tube so as to work the surface of said outer wall overlying said other tube upon alternate inflation of said tubes.

10. In a flexible covering for preventing ice-accumulation upon the leading edge of an airfoil, in combination, a flexible sheet backing, an outer wall of resilient rubber-like material overlying said backing, a plurality of spanwise-extending inflatable tubes of resilient rubber-like material disposed beneath said wall in side-by-side relation upon said backing with the adjacent margins of adjacent tubes contacting one another and secured together, each tube comprising an outer circumferential portion united with said outer wall and an inner circumferential portion including spaced marginal portions thereof comprising an elastic fabric reinforcement, said inner circumferential portion being attached to said backing intermediate said marginal portions with said marginal portions in unattached relation to said backing to permit lifting of said marginal portions away from said backing relative to the attached portion therebetween for inflation of the tube in overlapping relation to the position of the margin of the uninflated adjacent tube upon inflation of adjacent tubes in alternation.

11. Apparatus for preventing the accumulation of ice upon a surface exposed to ice-forming conditions, said apparatus comprising sheet backing material for mounting upon said surface, outer distensible wall material, and a pair of inflatable passages in side-by-side relation and defined by the backing material and outer wall material and laterally by spaced-apart marginal wall material joined with said backing material and outer wall material, the adjacent marginal wall portions of said pair each having its joinder with said outer wall material terminating laterally beyond its joinder with said backing material in the direction toward the other passage to provide separability of said portions with respect to said backing material between said passages, said adjacent marginal wall portions being of stretchable material and distensible for inflation of said passages to an inflated width greater than the uninflated width thereof, and said adjacent marginal wall portions being yieldable to swing and lift away from said backing material for inflation of each passage in overlapping relation to the position of the marginal wall portion of the uninflated adjacent passage upon alternate inflation of said passages.

HOWARD E. GREENE.

REFERENCES CITED

The following references are of record in the file of this patent:

UNITED STATES PATENTS

| Number | Name | Date |
|---|---|---|
| 2,436,889 | Heston | Mar. 2, 1948 |